US011048678B2

(12) United States Patent
Gupta et al.

(10) Patent No.: US 11,048,678 B2
(45) Date of Patent: Jun. 29, 2021

(54) BULK-LOAD FOR B-TREES

(71) Applicant: VMware, Inc., Palo Alto, CA (US)

(72) Inventors: Abhishek Gupta, Sunnyvale, CA (US); Robert T. Johnson, Palo Alto, CA (US); Richard P. Spillane, Mountain View, CA (US); Sandeep Rangaswamy, Mountain View, CA (US); Jorge Guerra Delgado, Fremont, CA (US); Srinath Premachandran, Fremont, CA (US); Kapil Chowksey, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 294 days.

(21) Appl. No.: 16/353,535

(22) Filed: Mar. 14, 2019

(65) Prior Publication Data
US 2020/0293506 A1 Sep. 17, 2020

(51) Int. Cl.
*G06F 16/22* (2019.01)
*G06F 7/08* (2006.01)
*G06F 16/2455* (2019.01)

(52) U.S. Cl.
CPC ............ *G06F 16/2246* (2019.01); *G06F 7/08* (2013.01); *G06F 16/24568* (2019.01)

(58) Field of Classification Search
CPC ... G06F 16/2246; G06F 16/24568; G06F 7/08
See application file for complete search history.

(56) References Cited

U.S. PATENT DOCUMENTS

2010/0088528 A1* 4/2010 Sion .................... G06F 21/725
713/193
2017/0351726 A1* 12/2017 Dean .................. G06F 16/2246

* cited by examiner

*Primary Examiner* — Loc Tran
(74) *Attorney, Agent, or Firm* — Patterson + Sheridan, LLP (57) ABSTRACT

Embodiments described herein are related to bulk loading data into a B-tree. Embodiments include generating a first leaf node of a B-tree by allocating a first page for the first leaf node from a leaf page queue comprising a first plurality of sequential pages; and writing one or more tuples to the first page allocated for the first leaf node. Embodiments further include generating an parent node for the first leaf node and a second leaf node of the B-tree by allocating a third page for the parent node from an parent page queue comprising a second plurality of sequential pages, the parent node comprising a first indication of the first leaf node and a second indication of the second leaf node, the first indication and the second indication stored in the third page allocated for the parent.

14 Claims, 8 Drawing Sheets

BULK-LOAD FOR B-TREES

BACKGROUND

B-trees are frequently used in various storage or database systems as a method and structure of storing data. Such storage systems may include one or more physical or virtual devices, including conventional hard disk drives of a computing device, Storage Area Network (SAN) devices or Virtual Storage Area Network (vSAN) devices. B-trees feature a balancing tree structure where inserted data is sorted during insertion. B-trees typically include a set of nodes each containing one or more key-value pairs. A key is an identifier of data, and a value is either the data itself or a pointer to a location (e.g., in memory or on disk) of the data associated with the identifier. Accordingly, a B-tree may be sorted according to the keys of the key-value pairs, and data can be read/written from the tree based on the key associated with the data. Because B-trees contain sorted key-value pairs, a read operation such as a query (e.g., a request for the value associated with a particular key in a data structure) to a B-tree may be completed by traversing the B-tree relatively quickly to find the desired key-value pair based on the key of the query. Thus, B-trees can be used to store data in a way that improves performance relative to other data structures (such as arrays) for certain operations (e.g., a query to an un-sorted array may take longer than a query to a B-tree).

Further, data can be bulk-loaded to a B-tree. Bulk loading involves importing or exporting large amounts of data relatively quickly, which differs from typical data loading (e.g., inserting rows of data one at a time into a database). Typical data loading is efficient for large amounts of data, particularly for B-trees. So for large amounts of data, bulk loading to a B-tree involves grouping data into blocks and transforming the blocks into nodes of the B-tree. Bulk loading to a B-tree is more efficient for large amounts of data because storage systems require fewer data accesses during bulk-loading.

However, for some computing systems, there may be insufficient system memory to perform a bulk load to a B-tree because a bulk load involves large, and sometimes unknown, quantities of data. Further, conventional techniques of writing data to a B-tree may not work well with data streams of unknown lengths. Thus, methods of bulk loading data to B-trees are needed that use less memory and less processing resources while also handling data streams of unknown lengths.

DETAILED DESCRIPTION

The following description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

Embodiments of the present disclosure relate to improved techniques for bulk loading to a B-tree or other type of tree structure. Bulk loading generally refers to a process in which a sorted set of tuples (e.g., an array of key-value pairs sorted in ascending or descending order based on keys) is consecutively "loaded" into a tree, such as a B-tree, by populating leaf nodes with the tuples and connecting the leaf nodes to parent nodes as appropriate to form a tree structure. For example, whenever a given leaf node is full (e.g., when a fixed number of pages allocated to the given leaf node are full) and there are still tuples in the set to be written to the tree, a new leaf node is created. Whenever a leaf node that is not the root node is created, the leaf node must be attached to a parent node, meaning that a pointer to the leaf node must be added to a node that is one level above the leaf node in the tree. The process continues up the tree, as whenever there is a node at any level of the tree that is not the root node and is not attached to a parent node, the node must be attached to a parent node. When a parent node does not exist, a parent node is created.

Generally, reading a bulk loaded tree as described above involves traversing the tree starting at the root node by following pointers through various levels of the tree to reach the left-most leaf node, reading the left-most leaf node, returning to the parent node of the left-most lead node to read the pointer to the next leaf node, reading the next leaf node, and continuing this process until all leaf nodes have been read. Generally, each time a given node at a given level is read, the parent node of the given node must be accessed to read the pointer to the next node at the given level before the next node at the given level can be read. Conventionally, disk blocks (e.g., corresponding to pages) allocated to nodes at a given level are not necessarily located consecutively or in proximity to one another on disk, and locations of disk blocks allocated to a given node other than the root node are determined based on pointers stored in a parent node of the given node.

While existing bulk loading techniques generally represent effective methods for storing data in tree structures, they may not result in the most efficient use of I/O operations for writing and reading to and from the tree. For example, when writing to a tree using existing techniques, once a given node is full, additional tuples cannot be written to the tree until a new leaf node has been created and attached to a parent node. When reading a tree built using existing bulk loading techniques, data can only be read from a single leaf node at a time, as parent nodes must be accessed to read pointers to subsequent leaf nodes. As such, techniques described herein improve bulk-loading and reading data from trees by using queues of pages that correspond to sequential available disk blocks for each level of a tree.

In certain embodiments of the present disclosure, a queue of sequential available pages is allocated for each level of the tree. Sequential available pages can refer to sequential disk blocks or pages that are sequentially (e.g., consecutively) located and/or addressed on disk and are free to be allocated to nodes. By using these queues of sequential available pages allocated to different levels of the tree, data may be written to and read from nodes at a given level, such as the leaf-node level, in larger I/O operations, as they can be written to or read from disk in large numbers by accessing sequential locations. For example, a large number of tuples may be written to multiple leaf nodes in a single write operation by using the sequential available pages in the queue for the leaf level. Subsequently, data may be read from multiple nodes at a given level in a single read operation by accessing consecutive pages without needing to read pointers from parent nodes to determine locations of subsequent pages at the given level.

In one example, a stream of sorted tuples is received from an I/O controller. A first leaf node of a B-tree may be generated by allocating a first page for the first leaf node from a leaf page queue comprising a first plurality of sequential pages and one or more tuples of the stream of tuples may be written sequentially to the first page allocated for the first leaf node. Upon determining that the first leaf node is full, a second leaf node of the B-tree may be generated by allocating a second page for the second leaf node from the leaf page queue, and one or more additional tuples of the stream of tuples may be written sequentially to the second page allocated for the second leaf node. In some embodiments, the one or more tuples and the one or more additional tuples may be written to the first and second leaf nodes in a single I/O operation. A parent node for the first leaf node and the second leaf node of the B-tree is generated by allocating a third page for the parent node from a parent page queue comprising a second plurality of sequential pages, the parent node comprising a first indication of (e.g., pointer to) the first leaf node and a second indication of (e.g., pointer to) the second leaf node, the first indication and the second indication stored in the third page allocated for the parent. This process may be repeated, moving up the different levels of the tree as needed, as tuples in the stream are processed. Generally, techniques described herein involve writing data to as many consecutive nodes at a given level as possible in a single I/O operation before writing data (e.g., pointers) into nodes at a level above the given level. For example, tuples from the stream may be written into four leaf nodes in a single I/O operation (e.g., by writing the tuples to sequential pages taken from the leaf page queue) before pointers to the four lead nodes are written to parent nodes of the four leaf nodes (e.g., the pointers are written to sequential pages taken from the parent page queue).

Such bulk loading allows for sequential loading of any amount of data into the B-tree in an organized fashion while optimizing latency and memory requirements. The improved bulk loading techniques disclosed herein may be useful for a variety of purposes, such as creation of Bloom filters (e.g., space-efficient probabilistic data structures generally used to test whether an element is a member of a set), range-queries-scans (which generally require the traversal of the entire B-tree), and data migration. Furthermore, techniques described herein may be useful whenever an entire B-tree is to be read into memory, such as in data migration.

It is noted that the term "node" may generally refer to a logical component (e.g., component object or data partition) within a logical storage system (e.g., a virtual disk) or a physical storage system, and is generally used when describing hierarchical relationships between logical components (e.g., sibling, parent, child, or the like).

Figure 1:
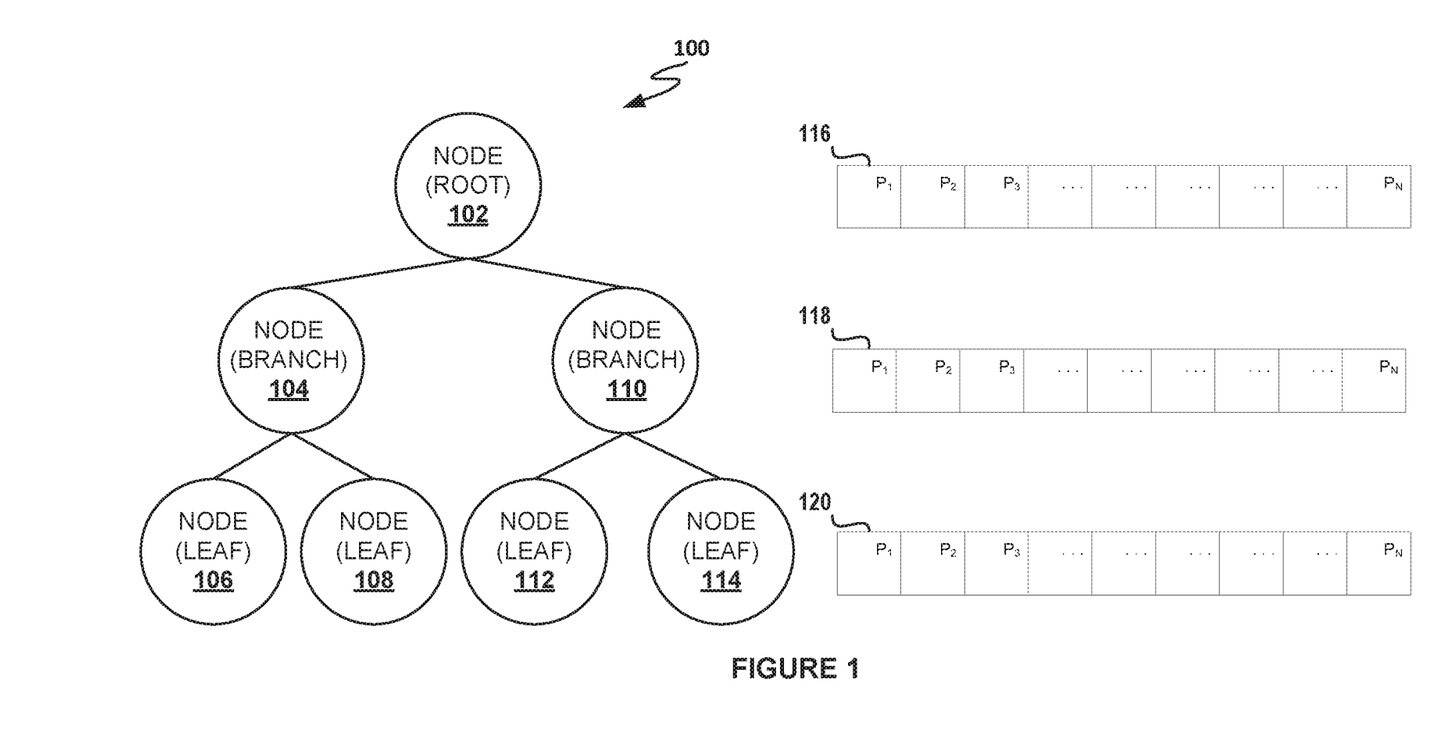
FIG. 1 is a block diagram of an example B-tree with queues for each level of the B-tree according to embodiments of the present disclosure.

FIG. 1 is a block diagram of an example B-tree 100 used for bulk loading data. As illustrated, B-tree 100 includes a plurality of nodes connected in a branching tree structure. Each node has one parent but may have many children. The top node of a B-tree is root node 102, which has no parent node. The middle level of B-tree 100 comprises branch nodes which have both parent and child nodes, including branch nodes 104 and 110. B-tree 100 has only three levels, and thus only a single branch level, but other B-trees may have more branch levels and total levels. The bottom level of B-tree 100 comprises leaf nodes with no children, including leaf node 106, 108, 112, 114. In some embodiments, the B-tree can have any number of middle levels of branch nodes, and so the B-tree can have child nodes that are leaf nodes and child nodes that are branch nodes. In some embodiments, each branch node has a maximum fullness of child nodes that the branch node can accommodate.

In some embodiments, the leaf nodes of the B-tree 100 store the data (e.g., tuples comprising keys and pointers to locations storing data values) of the B-tree 100 and the branch nodes and root nodes store the metadata of the B-tree 100. In some embodiments, the system stores the data of the B-tree in the leaf nodes sequentially. In one embodiment, the data stored in each leaf node is sequential, and while the data between leaf nodes may not be sequential, when reading the data of the leaf nodes the system can still sequentially read the data. Further details about how the B-tree stores data sequentially and how the system reads the B-tree are provided below.

Each level of the B-tree 100 is associated with a corresponding queue, including queues 116, 118, and 120. Each of queues 116, 118, and 120 includes a plurality of pages that correspond to sequential available disk blocks (depicted as $P_1$-$P_N$) and that are available to be allocated for nodes at a given level. Each queue of the B-tree 100 may have any number of pages. Furthermore, each node at a given level may be allocated any number of pages from the corresponding queue of the given level, although each node is generally allocated a fixed number of pages. In one example, each node is allocated one page. In another example, pages $P_1$ and $P_2$ of queue 118 may be allocated to node 104 and pages $P_3$ and $P_4$ of queue 118 may be allocated to node 110 because queue 118 is associated with the level of nodes 104 and 110 (e.g., the second level of B-tree 100). In some embodiments, the queues of the B-tree 100 have a number of pages based on an optimal I/O size of the system. For example, if the system has an optimal I/O size of 32 kb and each page of each queue stores up to 4 kb of data, then each queue of the B-tree 100 has 8 pages. In one such example, the leaf nodes have a size of 8 kb (corresponding to 2 pages of data), and thus, at least four leaf nodes are stored is sequential disk blocks.

In some embodiments, pages of the queues comprise disk blocks dedicated for storing data of the B-tree. In such embodiments, the stored data of the B-tree can include pointers to other nodes of the B-tree and data from a bulk load operation. In some embodiments, the queues may run out of pages and so pages may be appended to the end of the queues in order to continue loading more data (e.g., data tuples, pointers) into pages of the queues of the B-tree. For example, every time a queue is emptied, it may be refilled to its maximum capacity. When additional pages are appended to the queue, the additional pages are sequential (e.g., consecutively located on disk) with respect to each other, but may not necessarily be sequential with pages that were previously in the queue. As such, a single I/O operation may be used to read data from or write data to all pages that were added to the queue together, but separate I/O operations may be needed to read data from or write data to pages that were added to the queue at different times.

B-trees may be subdivided into subtrees. A subtree typically includes part of the complete set of nodes of a tree and includes a subtree root. For example, in B-tree 100, a subtree may be defined with branch node 110 as the subtree root, and include the child nodes of branch node 110.

Performing a bulk load of data into a B-tree, such as B-tree 100, conventionally requires performing a full traversal of the B-tree before loading data into a particular node. Such full traversal can differ based on the method of traversal (e.g., based on the order of the nodes). The present disclosure provides a method for bulk loading a B-tree without a full traversal of the B-tree, incorporating a sequential order of loading data into the B-tree.

Figure 2:
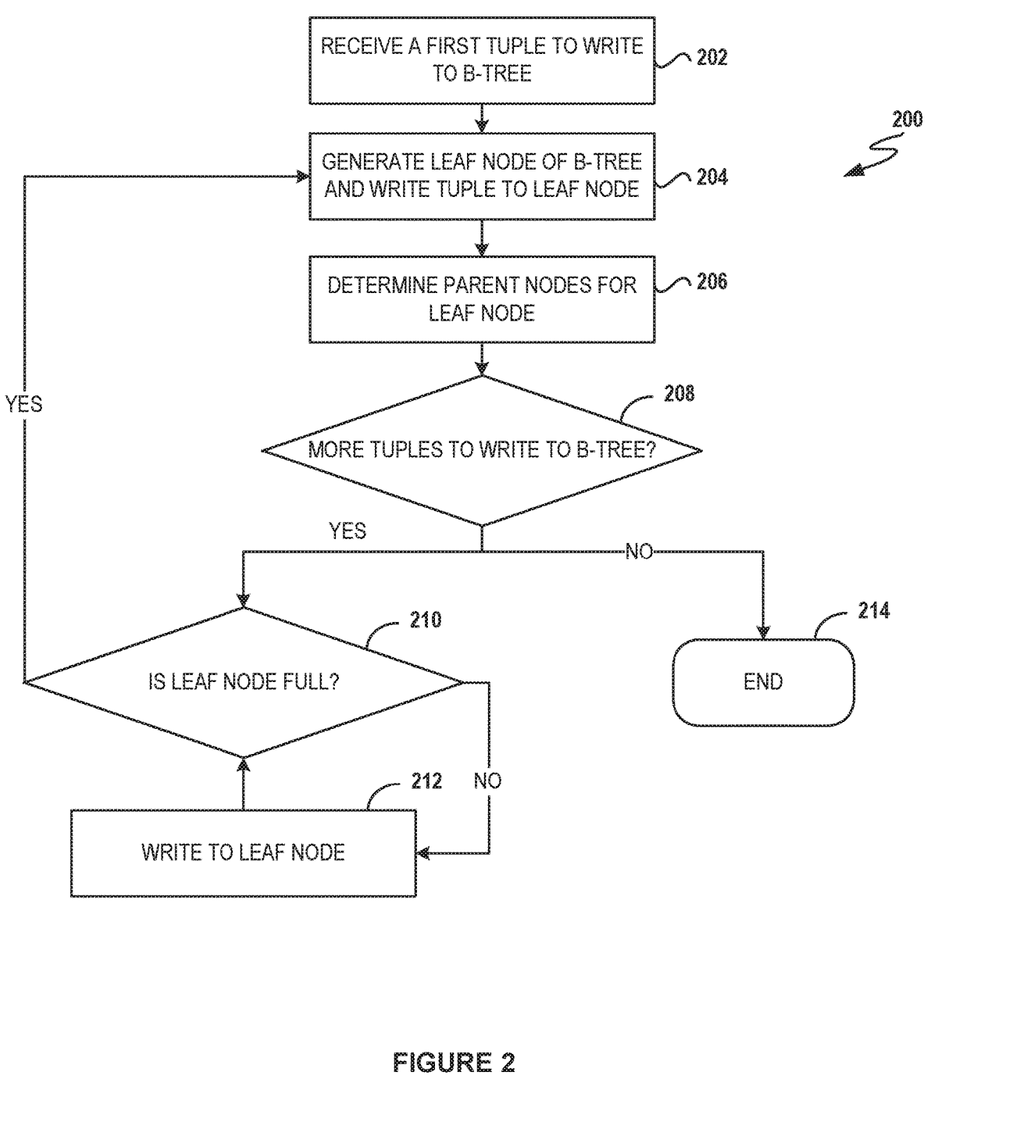
FIG. 2 depicts a flow diagram of example operations for performing bulk load of a B-tree according to embodiments of the present disclosure.

FIG. 2 depicts a flow diagram of example operations 200 performed on a B-tree, such as B-trees 100 of FIG. 1. Prior to operations 200, a storage system (e.g., a system as described below with respect to FIG. 11) receives instructions to proceed with an operation to perform a bulk load of data to the B-tree. For example, the bulk load may be performed as part of a process for data migration or data recovery in case of failure when building the B-tree. Apart from queries, operations performed on a tree typically include write operations, such as insertions, modifications, or deletions of data in the B-tree.

Operations 200 begin at step 202, where the system receives a first tuple to write to a B-tree. In one embodiment, the first tuple is from a stream of sorted tuples received by the system (e.g. from a I/O controller). In one embodiment, the system does not have information on the length of the stream of tuples. While the present disclosure uses tuples, the present disclosure is not limited to tuples of data, and can include any arrangement of data, such as key-value pairs.

At 204, the system generates a leaf node for the B-tree. In one embodiment, the system writes the first tuple received to the leaf node by writing the first tuple sequentially to pages allocated to the leaf node in a queue of sequential pages corresponding to the leaf level. For example, the system writes the first tuple to page $P_1$ of queue 120 of FIG. 1 because the system has allocated page $P_1$ of queue 120 to leaf node 106 of FIG. 1.

At 206, the system determines parent nodes for the leaf node. In one embodiment, because the leaf node is the first node of the B-tree, the system designates the leaf node as the root node and cannot determine any parent nodes for the root node because the root node has no parent. In some embodiments, the parent nodes comprise non-leaf branch nodes or the root node. Further details about determining the parent nodes for the leaf node are provided with respect to FIG. 3.

At 208, the system determines if the system needs to write more tuples to the B-tree. As mentioned, in one embodiment, the system has no information on the length of the stream of tuples. In one embodiment, the system uses a buffer to assist in determining whether the stream of tuples comprises more tuples to write to the B-tree. For example, the system temporarily stores a few incoming tuples of the stream of tuples in the buffer and determines if there are more incoming tuples beyond the temporarily stored tuples by checking if the buffer is empty.

If the stream of tuples has no more tuples to write to the B-tree, then at 214, the system has finished bulk loading the B-tree. In one embodiment, because of the sequential writing of the data tuples to the B-tree into sequential pages from the queue, the system can easily migrate the data of the B-tree to other data structures (e.g., by reading the tuples from the leaf node in a single I/O operation).

However, if the stream of tuples has more tuples to write to the B-tree, then at step 210, the system determines whether the leaf node is full. Because the pages allocated to each node of the B-tree have limited amounts of space, the system needs to keep track of the fullness of the nodes and the corresponding allocated pages in the leaf queue. With a leaf node, fullness refers to the amount of space available in the pages allocated to the leaf node from the leaf queue into which the system may write data tuples. In one embodiment, the fullness of a leaf node corresponds to any number of pages as set by the system (e.g., the number of pages allocated to each node). In another embodiment, each leaf node has the same fullness or the same number of allocated pages of the leaf queue as set by the system.

If the leaf node is not full, then at step 214, the system continues to write tuples to the allocated pages of the leaf node until the allocated pages of the leaf node are full. By continuing to write to the allocated pages of the leaf node while the allocated pages have available space, the system maintains the sequential order of the data tuples as received from the stream of tuples. Also, because the pages allocated to the leaf node come from the queue, the pages are sequentially located on disk. As such, a large number of tuples may be written to a plurality of pages in a single I/O operation. In some embodiments, the system writes the data tuples to sequential blocks of the allocated pages of the leaf queue.

Once the leaf node is full, the system repeats the process by returning to step 204 and generating a new leaf node of the B-tree. Then, at step 206, parent nodes are determined for the new leaf node. In one embodiment, because the leaf node is the second node of the B-tree, the system generates a new parent node at a level above the two leaf nodes, the parent node including pointers to the two leaf nodes stored in one or more pages allocated to the parent node from a queue of sequential available pages associated with the level of the parent node in the tree (which, at this point, is now the root level). Operations 200 may continue until all tuples in a stream have been received and written to the tree.

Figure 3:
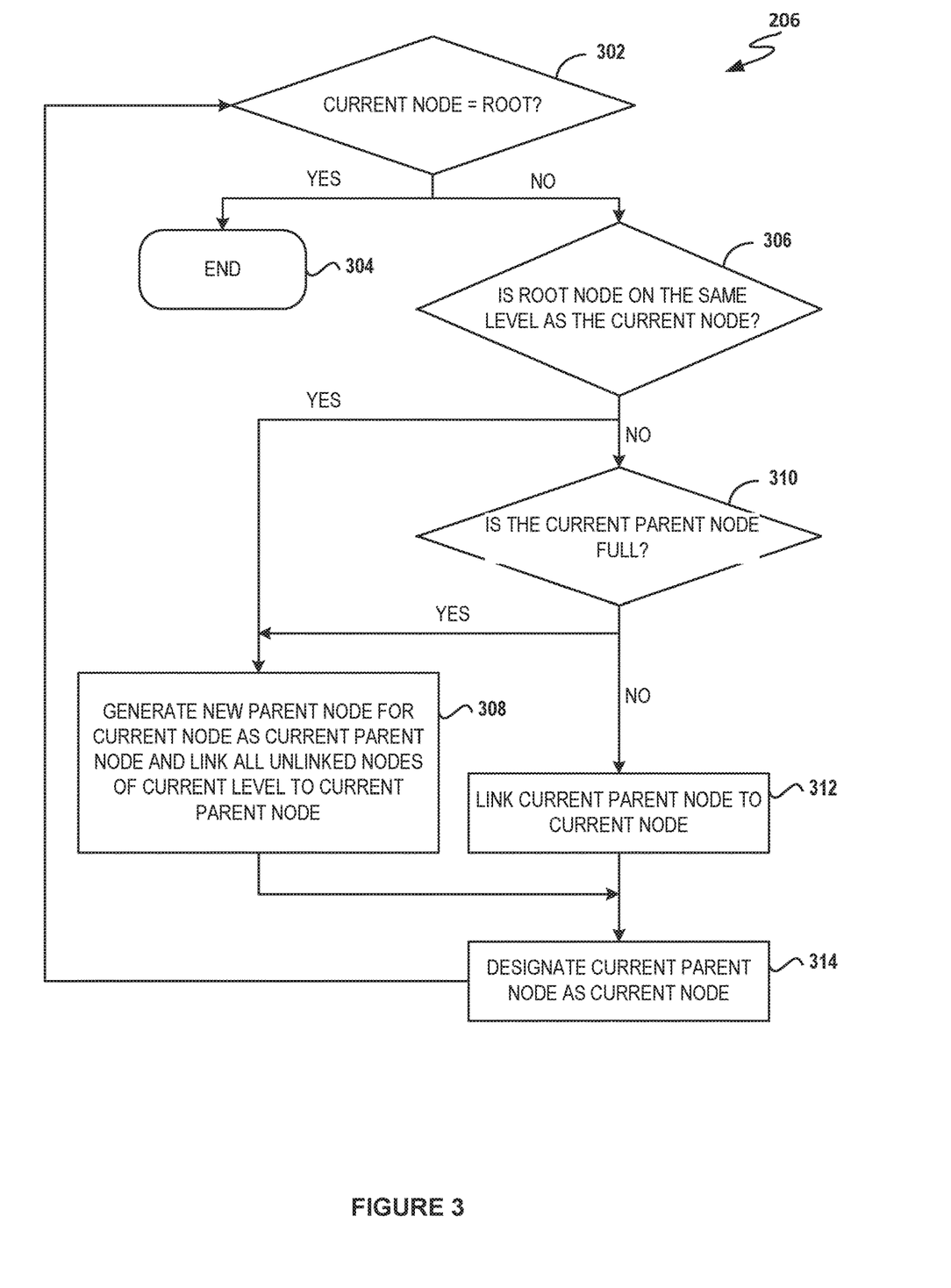
FIG. 3 depicts a flow diagram of example operations for performing bulk load of a B-tree according to embodiments of the present disclosure.

Determining parent nodes for a given node at step 206 is described in more detail with respect to FIG. 3.

FIG. 3 depicts a flow diagram of example operations 300 performed on a B-tree, such as B-tree 100 of FIG. 1. In one embodiment, operation 300 determines the parent nodes for the nodes of the B-tree (e.g., leaf nodes and branch nodes), such as in step 206 of operations 200 in FIG. 2.

Operations 300 begin at 302 with the system determining whether the current node is a root node. Determining the root node allows the system to exit the operation of determining parents for a node as the B-tree has nothing above the root node.

If the current node is the root node, then at 304, the system has finished determining the parent nodes for the current node, because a root node has no parent.

If the current node is not the root node, then at step 306, the system determines whether the root node is on the same level as the current node. For example, if the system generates a second leaf node and the first leaf node is the root node, then the second leaf node is the current node and the first leaf node is on the same level as the current node.

If the root node is on the same level as the current node, then at step 308, the system generates a new parent node for the current node and links all unlinked nodes of the current level to the new parent node. For example, in an embodiment where the system has generated two leaf nodes, then the system generates a parent node for the two leaf nodes and links the two leaf nodes to the parent node (e.g., by storing pointers to the two leaf nodes in one or more pages allocated to the parent node from a queue of sequential available pages associated with a level of the parent node). The system then indicates the parent node is the parent of the two leaf nodes. In one embodiment, the parent node to the current node is called the current parent node. In one embodiment, the current parent node is either the highest node or the right-most node at the highest level of the B-tree. Where the current parent node is the highest node of the B-tree, the current parent node is also the new root node.

If the root node is not on the same level as the current node, then at step 310, the system determines whether the current parent node is full.

If the current parent node is full, then the system continues onto to step 308 and generates a new parent node for the current node and links all unlinked nodes of the current level to the new parent node. For example, if the system has generated three leaf nodes and a current parent node with a maximum fullness of 2 leaf nodes, the system has already linked the first two leaf nodes to the current parent node, leaving the third leaf node with no parent. Because each leaf node needs a parent node, the system generates a new parent node for the third leaf node, marks the new parent node as the new current parent node, and links the unlinked third leaf node to the new current parent node. In certain embodiments, where the root node becomes full, another node is generated at the root level and a new level is added on top of the root level. In such embodiments, a parent node is generated for the root node and the other node of the root level, and the newly-generated parent node becomes the new root node.

If the current parent node is not full, then at step 312, the system links the current node to the current parent node. For example, if the B-tree has two leaf nodes and a current parent node with a maximum fullness of 3 leaf nodes, the system has already linked the first two leaf nodes to the current parent, and thus the system links the third leaf node to the current parent node. By continuing to write to the allocated pages of the current parent node while the allocated pages have available space, the system maintains the sequential order of the nodes (either leaf or non-leaf nodes) as generated. In some embodiments, the system writes the pointers to other nodes in sequential blocks of the allocated pages of the branch queues.

Once the current node is linked to a current parent node, either at step 308 or at step 312, then at step 314, the system designates the current parent node as the current node and returns to step 302. Designating the current parent node as the current node also repeats the above operations on branch nodes of the B-tree.

FIGS. 4-8 illustrate a bulk-load performed on a B-tree 400 using the example operations 200 and 300 of FIGS. 2 and 3. As illustrated, for B-tree 400, an initial step of the bulk load includes receiving a first tuple to write to the B-tree 400 and generating a first node 402 of the B-tree 400. Generally, a bulk load to a B-tree begins when the system receives a stream of data (e.g., tuples).

Figure 4:
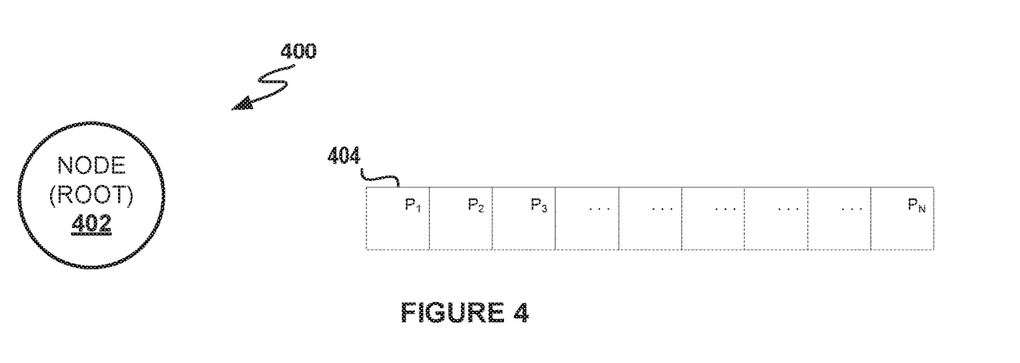
FIG. 4 depicts an example layout for nodes of a B-tree, in accordance with embodiments of the present disclosure.

FIG. 4 illustrates an example layout of a B-tree corresponding to steps 202 and 204 of FIG. 2. In FIG. 4, the system generates a first node 402 of the B-tree 400 (step 204) after receiving a first tuple to write to a B-tree (step 202). Because the B-tree 400 has no other nodes, node 402 is the root node of the B-tree. When the system generates node 402 (or at some point prior to generating node 402), the system generates a leaf queue 404 and allocates sequential available pages $P_1$-$P_N$ for the data of leaf nodes of the B-tree. Each leaf node of the B-tree has allocated pages of the leaf queue 404, and each page of the leaf queue 404 corresponds to at least one disk block for data loading. In some embodiments, each leaf node of the B-tree is allocated a set number of pages from the leaf queue. In some embodiments, each page of the leaf queue 404 comprises a set amount of disk blocks/space for data loading. After generating node 402, the system writes data tuples of the stream of data tuples to the pages allocated to node 402. In some embodiments, the system writes the data tuples sequentially to the pages allocated for node 402 based on when the system receives the data tuples.

Figure 5:
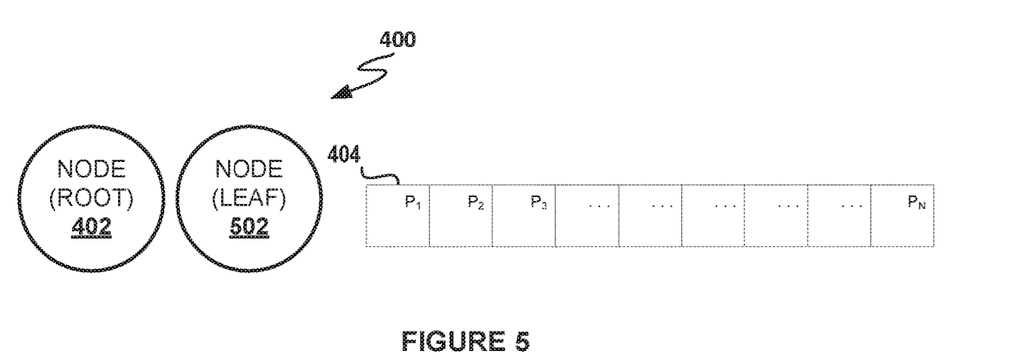
FIG. 5 depicts another example layout for nodes of a B-tree, in accordance with embodiments of the present disclosure.

FIG. 5 illustrates another example layout of a B-tree corresponding to steps 206, 208, 210, and 212 of FIG. 2. For example, after the first node 402 of the B-tree 400 has been generated, the system needs to determine whether the first leaf node needs parent nodes (step 206). Because the first leaf node 402 does not need a parent node as a root node has no parent, the system can continue to determine whether the stream of tuples has more tuples to write to the B-tree 400 (step 208). In the example B-tree 400, the stream of tuples has more tuples to write to the B-tree 400, which prompts the generation of the second node 502 of the B-tree 400.

At some point during the writing of data tuples to the B-tree 400, the pages allocated for node 402 become full, which corresponds to steps 210 and 212 of FIG. 2. So, when the pages allocated for node 402 have no more free space for the incoming data tuples, the system marks node 402 as full, and the system generates a new node 502 for the B-tree, corresponding to the system returning to execute step 204 of FIG. 2. Like with node 402, when the system generates node 502, the system allocates sequential available pages of the leaf queue 404 for node 502 and the system writes data tuples of the stream of data tuples to the pages allocated to the node 502. In some embodiments, the system may write as many data tuples as possible in a single I/O operation to the sequential pages allocated to nodes 402 and 502. In some embodiments, once node 402 is full, the system allocates node 502 as the next leaf, and the system gives the leaf nodes disk block addresses. The disk block addresses can have sequential addresses (e.g., 72 and 73). In another example, the nodes' addresses are not sequential (e.g., 72 and 80) because the system was not able to allocate continuous pages.

Figure 6:
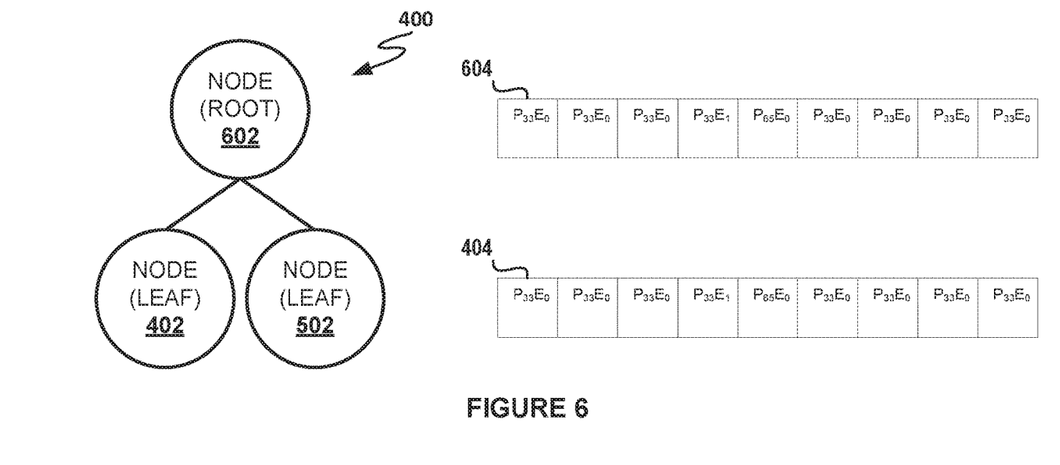
FIG. 6 depicts another example layout for nodes of a B-tree, in accordance with embodiments of the present disclosure.

Because the unconnected two nodes 402 and 502 of B-tree 400 in FIG. 5 do not form a tree as-is, the B-tree 400 needs more nodes, specifically parent nodes, in order to form a tree (corresponding to step 206 of FIG. 2). Accordingly, in FIG. 6, the system generates an parent node 602, which becomes the new root node for B-tree 400. When parent node 602 is generated (or at some point prior to generating parent node 602), the system also generates an parent queue 604 for the current level of the B-tree 400. Each level of a B-tree has a queue, such as parent queue 604 in FIG. 6, and the level of nodes in a B-tree corresponds to the depth of the node from the root. In FIG. 6, the B-tree has two levels: the level comprising the parent node 602 and the level comprising the two leaf nodes 402 and 502. The parent queue 604 has sequential available pages allocated for data corresponding to the nodes of the current level, such as parent node 602, and each page of the parent queue 604 corresponds to at least one disk block. In some embodiments, each parent node of the B-tree 400 has a set number of pages allocated in the parent queue 604. In some embodiments, each page of the parent queue 604 comprises a set of blocks for pointers to other nodes of the B-tree. After generating parent node 602, the system writes the pointers to leaf nodes 402 and 502 to one or more of the pages allocated to the parent node 602. In some embodiments, the system writes the pointers to the leaf nodes sequentially to the pages allocated for parent node 602 based on the order in which the system generates the leaf nodes.

In some embodiment, generating the parent node 602 involves steps 302, 306, 308, and 314 of FIG. 3. In such embodiments, after generating the second leaf node 502, the system determines the parent nodes for the second leaf node 502 as illustrated in FIG. 3. To begin determining the parent nodes for the leaf node, which also is the current node, the system determines whether the current node is the root node (step 302). Because the second leaf node 502 is not the root node, the system continues, at 306, with determining whether the root node is on the same level as the current node (which is the second leaf node). At this point, the root node is the first leaf node 402 (because the system has not generated the parent node yet) and is therefore on the same level as the current node, so the system steps to step 308. At step 308, because the root node is on the same level, the system knows that a root node is the only node of its level and so the system generates a new parent node for the current node, links all unlinked nodes of the current level to the new parent node, and becomes the new root node of the B-tree 400. In some embodiment, the system also designates the new parent node as the current parent node and in such embodiments, the current parent node tracks the progression of generating parent nodes for various nodes of the B-tree 400, leaf or branch. After generating the parent node 602, at 314, the system designates the parent node 602 as the current node to determine whether the parent node 602 as the current node needs parent nodes. However, because the new parent node 602 is the new root node, the system finishes operation 206 at step 302 and 304 and continues with operations 200 of FIG. 2.

Figure 7:
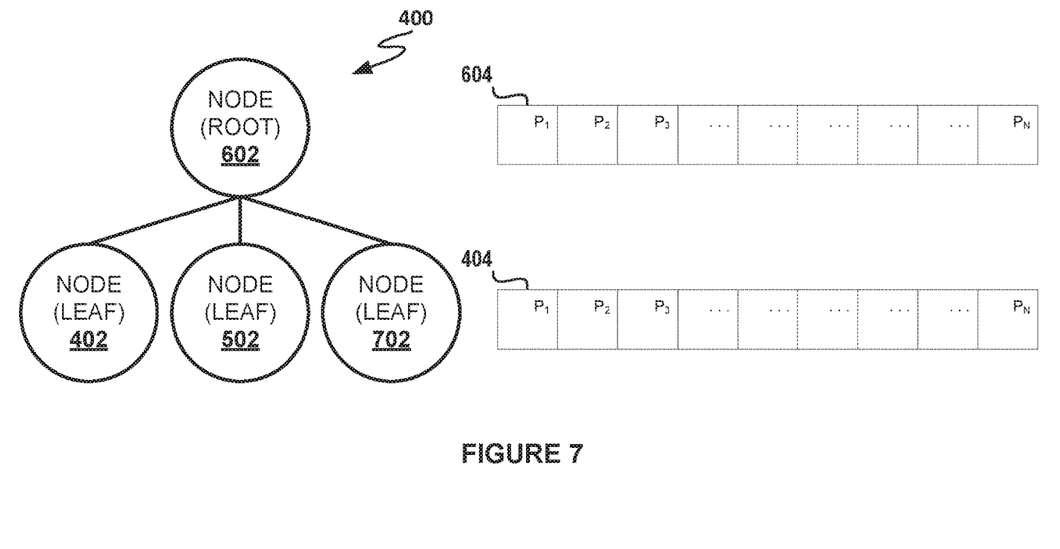
FIG. 7 depicts another example layout for nodes of a B-tree, in accordance with embodiments of the present disclosure.

In FIG. 7, the system generates a third leaf node of the B-tree 400. Again, at some point during the writing of the data tuples to the B-tree 400, the pages allocated for node 502 become full. So, when the pages allocated for node 502 have no more free space for the incoming data tuples, the system determines that node 502 is full, and the system generates a new node 702 for the B-tree 400. Like with nodes 402 and 502, when the system generates node 702, the system also allocates sequential available pages from the leaf queue 404 for node 702 and the system writes data tuples of the stream of data tuples to the pages allocated to the node 702.

At this point, the system needs to connect the new leaf node 702 to the rest of the B-tree 400. After generating leaf node 702, the system determines parent nodes for the new leaf node 702. In FIG. 7, the system writes the pointer to leaf node 702 to the pages allocated to parent node 602 of the parent queue 604. In the exemplary illustration, the pages allocated to parent node 602 have not become full, and therefore the pages allocated to parent node 602 could store the pointer to leaf node 702. In one embodiment, the system links the new leaf node 702 to the parent node 602 (step 312) because the new leaf node 702 is not the root node (step 302), the new leaf node 702 is not on the same level as the root node (step 306), and the current parent (or the most recent branch node of the level above the current node) is not full (step 310).

Figure 8:
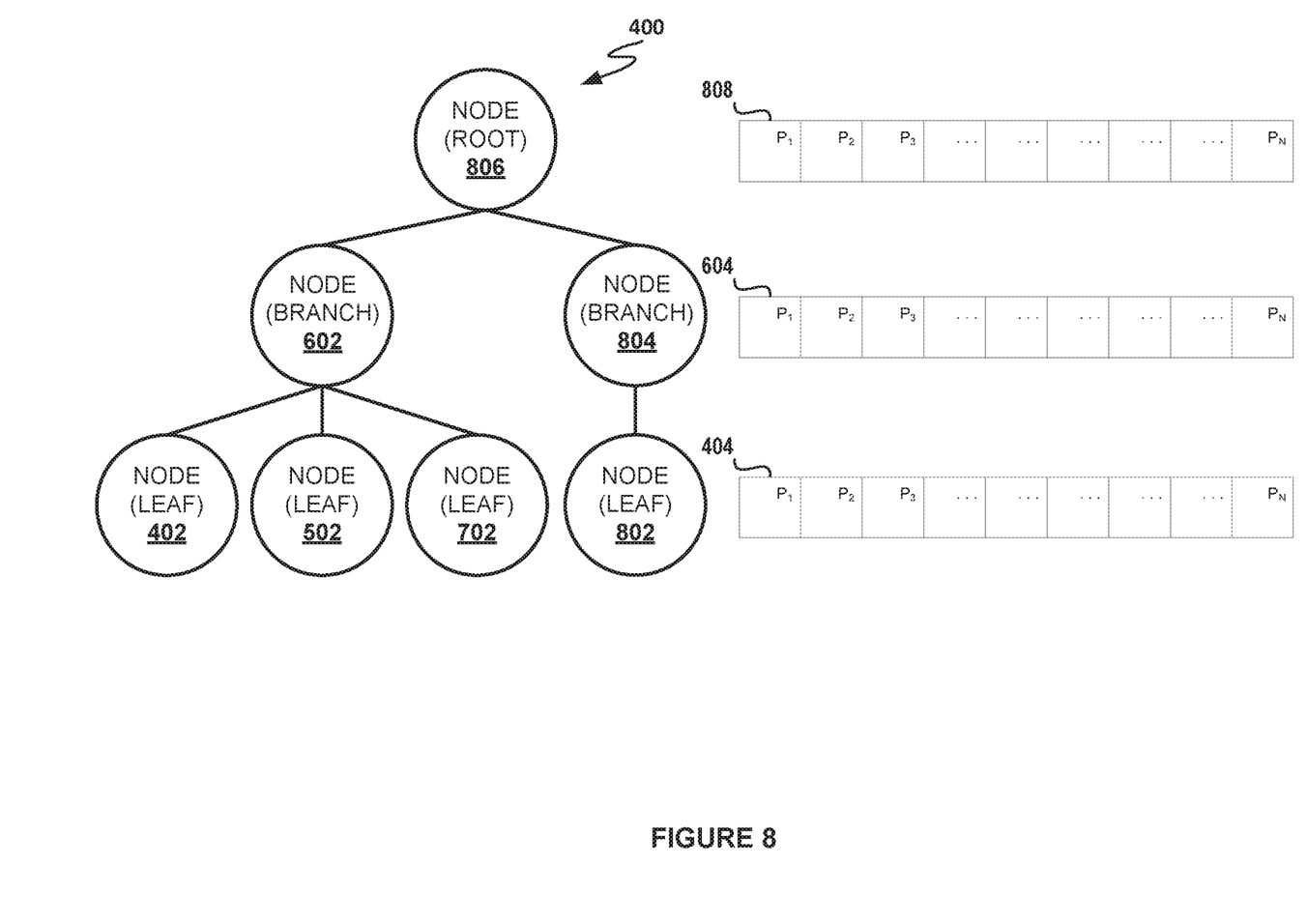
FIG. 8 depicts another example layout for nodes of a B-tree, in accordance with embodiments of the present disclosure.

In FIG. 8, the system generates a fourth leaf node 802 of the B-tree 400. Again, at some point during the writing of data tuples to the B-tree 400, the pages allocated for node 702 become full. So when the pages allocated for node 702 have no more free space for the incoming data tuples, the system determines that node 702 is full, and generates a new leaf node 802 for the B-tree 400. Like with nodes 402, 502, and 702, when the system generates node 802, the system allocates sequential available pages of the leaf queue 404 for node 802 and writes data tuples of the stream of tuples to the pages allocated for node 802.

Like with pages allocated for leaf nodes, pages allocated for parent nodes can also become full (step 310). Once generated, the system needs to connect or link the leaf node 802 to the rest of the B-tree 400; however, the pages allocated for parent node 602 have become full. So, when the pages allocated for parent node 602 have no more free space for the pointer to leaf node 802, the system determines that parent node 602 is full and generates a new parent node 804 for the B-tree (step 308). Like with parent node 602, when the system generates parent node 804, the system allocates sequential available pages of the parent queue 604 for parent node 804 and writes the pointer to leaf node 802 to the pages allocated to parent node 804.

Again, like with leaf nodes, parent nodes (and their child nodes) unconnected to each other do not form a tree as-is, and so, the B-tree 400 need more nodes, specifically more parent nodes, in order to form a tree. Accordingly, in FIG. 8, another parent node 806 is generated and becomes the new parent node for B-tree 400 (step 308). In an exemplary embodiment, the new parent node 806 is the parent node (e.g., parent node) of parent nodes 602 and 804 and becomes the new root node for the B-tree 400. The system also generates a parent queue 808 for the newest level of the B-tree 400, and the newest parent queue 808 has sequential available pages allocated for data corresponding to the nodes of the current level, such as parent node 806, each page of the parent queue 808 corresponding to at least a disk block. After generating the parent node 806, the system writes the pointers to the parent nodes 602 and 804 to the pages allocated to the parent node 806. In some embodiments, the system writes pointers to the parent nodes sequentially to the pages allocated for parent node 806 based on the order in which the system generates the parent nodes.

In some embodiments, generating the parent nodes 806 involves steps 302, 306, 310, and 308 of FIG. 3. In such embodiments, after generating the second branch node 804, the system needs to determine whether the branch node 804 needs an parent node after generating the branch node 804 as the parent node (herein the parent node) for leaf node 802. In some embodiments, after generating the branch node 804, the system designates the branch node 804 as the current parent node (step 308) and then also designates as the current node (step 314). The system then continues by again determining the parent nodes of the current node (i.e., the non-leaf node 804) starting at step 302.

Starting again at step 302, the system determines the parent nodes of the branch node 804 by determining whether the branch node 804 is the root node. Because the branch node 804 is not the root node, the system continues at step 306 and determines whether the root node of the B-tree 400 is on the same level as the branch node 804. At this point, the root node is the branch node 602, so the system continues to step 308 and generates a new parent node 806 as the new root node. The system also links unlinked nodes of the current level of branch node 804 to the newly generated parent node/root node 806. In some embodiments, nodes 602 and 804 are unlinked nodes because prior to generating parent node 806, nodes 602 and 804 have no parent node. By linking the nodes 602 and 804 to the parent node 806, the B-tree 400 no longer has any unconnected or unlinked nodes. In some embodiments, the system continues, at step 314, by designating the parent node 806 as the new current node and replaying step 206 with the current node as parent node 806 before continuing the operations 200 of FIG. 2.

Figure 9:
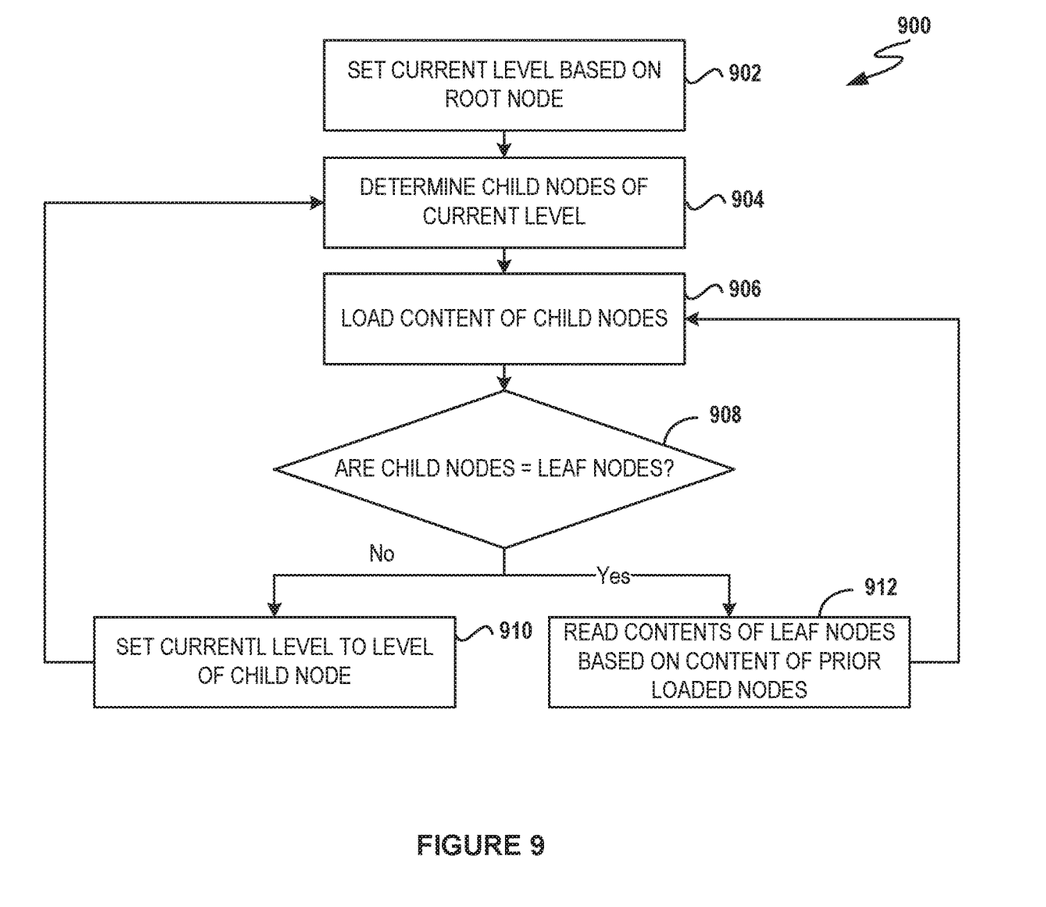
FIG. 9 depicts a flow diagram of example operations for performing bulk load of a B-tree according to embodiments of the present disclosure.

FIG. 9 illustrates example operations for reading a B-tree having undergone a bulk-load operation 200 of FIG. 2. The system receives instructions to perform a read of the B-tree, such as the B-tree 400 of FIG. 8. The following description of FIG. 9 uses the B-tree 400 of FIG. 8 as an exemplary B-tree to read.

Operations 900 begin at step 902 with the system setting the current level based on the root node. In some embodiments, when the system receives read instructions, the system only has a pointer to the root node of the B-tree 400 and only has information about the root node. Accordingly, the system sets the current level based on the root node and only has information about the singular root node.

At step 904, operations 900 continue with the system determining the child nodes of the current level. Using B-tree 400 of FIG. 8 as an example, the system knows that the current level is the same level as the root node, and determines nodes 602 and 802 as the child nodes of the current level. In some embodiments, the system reads all child nodes of the current level sequentially in a single I/O operation. In such embodiment, a single I/O operation involves reading as much as possible for each level.

At step 906, operations 900 continue with the system loading the content of the child nodes of the current level. The content of child nodes of the current level may comprise pointers to other nodes of the B-tree or pages having loaded data tuples. Using B-tree 400 of FIG. 8, the system loads the content of nodes 602 and 802, and thereby loads pointers to other nodes of the B-tree 400. In some embodiments, the system loads the content of the child nodes based on available resources. For example, the system loads the contents of the first eight pages of a branch level queue, such as the branch level queue 604 of FIG. 8, and thereby allowing the system to load the contents of the leaf level queue. In some embodiments, the system only reads the contents of the left-most node at a branch level in order to obtain a pointer to the left-most node in the next level down which in this case is the leaf level. In some embodiments, the system loads the contents of the child nodes based on an optimal IO size.

At step 908, operations 900 continue with the system determining whether the child nodes are leaf nodes. In some embodiments, the leaf nodes comprise pages having loaded data tuples while the non-leaf nodes (e.g., branch and root) comprise pointers to other nodes (e.g., non-leaf nodes, leaf nodes).

If the child nodes are not leaf nodes, at step 910, operations 900 continue with the system setting the current level to the level of the child node. In some embodiments, because the level of the child nodes does not have leaf nodes, the system steps down to the level of the child nodes in order to determine which level of the B-tree has leaf nodes. In some embodiments, after setting the current level of the child nodes, the system replays step 904 and steps thereafter.

If the child nodes of the current level are leaf nodes, at step 912, operations 900 continue with the system reading the contents of leaf nodes based on the content of prior loaded nodes (e.g., by accessing the left-most leaf node using a pointer read from the left-most node at the current level). In one embodiment, the system reads the contents of all or a subset of the pages from leaf queue 404 in a single I/O operation. In one embodiment, because the system loaded data tuples sequentially at the leaf level into sequential pages on disk, the system accordingly reads the data tuples sequentially when reading the pages of the leaf queue 404. Because pages $P_1$-$P_N$ of leaf queue 404 are sequential, the system can potentially read the contents of all of pages $P_1$-$P_N$ in a single I/O operation based on a pointer to the left-most leaf node without accessing any parent nodes to determine pointers to subsequent leaf nodes. In some embodiments, the system may also use the sequentially-loaded contents of the parent queues, such as parent queues 604 and 808 of FIG. 8. In such embodiments, because the contents of parent queues comprise pointers to other nodes, the system leverages these node pointers in order to sequentially read the data tuples loaded into the B-tree (e.g., for any pages that are not sequential). For example, if leaf queue 404 needed to be refilled before all of the leaf nodes were written to, the subsequent pages with which the leaf queue were refilled may not necessarily be sequential on disk with respect to the pages that were previously in leaf queue 404. As such, a pointer from a parent node may be needed to access the first leaf node to which these subsequent pages were allocated. In one embodiment, the system reads the sequential blocks as written in the pages allocated to the leaf nodes from the leaf queue and the pointers to the branch nodes and to the leaf nodes of the parent queues.

In some embodiments, at some point, the system finishes reading the contents of the leaf nodes based on the optimal IO size and needs to continue reading the data of the B-tree. The system then returns back to the contents of the prior loaded nodes (e.g., the parent branch nodes) in order to read the pointers of the next leaf nodes and read the contents of the next leaf nodes. For example, the system reads the contents of pages $P_1$-$P_N$ of leaf queue 404, which correspond to leaf nodes 402, 502, and 702 respectively (e.g., all pages in leaf queue 404 had been used by the time node 702 was full, and leaf queue 404 had to be refilled before node 802 was written to), and needs to continue reading the data of the B-tree. Because the system has read the content (e.g., the leaf node pointers) of branch node 804, the system goes to root node 806 in order to find the next branch node 804 and its child leaf nodes. This method of reading the bulk loaded B-tree can apply to B-tree of any size written according to the methods in the present disclosure.

Figure 10:
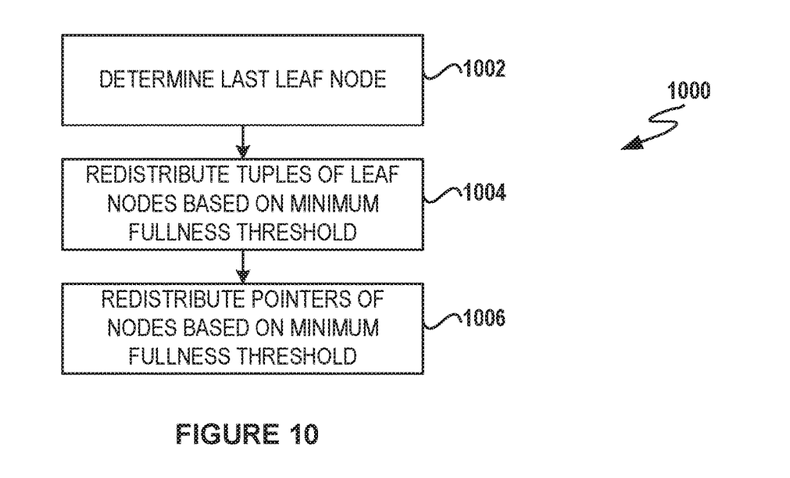
FIG. 10 depicts a flow diagram of example operations for performing bulk load of a B-tree according to embodiments of the present disclosure.

FIG. 10 illustrates example operations of rebalancing the B-tree 400 of FIG. 8, according to embodiments of the present disclosure. In one embodiment, the system receives instructions to rebalance the B-tree, such as B-tree 400 of FIG. 8. In one embodiment, once the system finishes bulk-loading the B-tree, the leaf nodes of the B-tree need rebalancing because some of the branches of the B-tree may have more leaf nodes than other branches, and/or because one or more nodes in the B-tree are a below a minimum fullness threshold. The following description of FIG. 10 uses the B-tree 400 of FIG. 9 as an exemplary B-tree to rebalance.

Operations 1000 begin at step 1002 with the system determining the last leaf node. In some embodiments, the last leaf node comprises the right-most leaf node of the B-tree and contains the most recently written data tuples from the stream of data tuples. In order to rebalance the tree, the system needs to identify the last leaf node.

At step 1004, operations 1000 continue with the system redistributing the tuples of the leaf nodes based on the minimum fullness threshold. In certain embodiments, each node has a minimum fullness threshold, and if a given leaf node is below a minimum fullness threshold, data from pages allocated to a neighboring leaf node may be moved into pages allocated to the given leaf node such both the given leaf node and the neighboring leaf node meet the minimum fullness threshold. It is noted that when data is moved between nodes for rebalancing purposes, the data should be kept in sequential order. In certain embodiments, the system redistributes data tuples amongst the leaf nodes. In some embodiments, the redistribution occurs between the rightmost leaf and the leaf left of the rightmost leaf. Data tuples can be redistributed from the leaf left of the rightmost leaf to the rightmost leaf to meet minimum fullness threshold. For example, assume the leaf left of the rightmost leaf is 100% full and the rightmost leaf is 1% full. In order to meet a 50% minimum fullness threshold, 49% of the tuples of the leaf left of the rightmost leaf are moved to the rightmost leaf, so that the leaf nodes are 51% and 50% full respectively. Accordingly, both nodes have met the minimum fullness threshold. In another embodiment, the system counts all the leaf nodes and all the tuples of the leaf nodes, and redistributes based on the number of leaf nodes.

At step 1006, operations 1000 continue with the system redistributing the pointers of the nodes based on the minimum fullness threshold. In certain embodiments, non-leaf nodes have a minimum fullness threshold, and so rebalancing occurs in order for the non-leaf nodes to meet the minimum fullness threshold. The system can perform the rebalancing by recursively redistributing the pointers of nodes—either non-leaf or leaf—after the leaf nodes have been balanced, going from the leaf level to the root level. Like with redistributing tuples of the leaf nodes, the system moves pointers from a node on the same level to a neighboring node in order to meet the minimum threshold criterion. In some embodiments, the system moves pointers written on pages of one parent node to pages of another parent node so that the parent nodes have an equal number of leaf nodes. For example, using B-tree 400 of FIG. 8, the system redistributes the pointer of leaf node 702 so that the parent node of leaf node 702 is branch node 804 and the number of leaf nodes of each parent node (602 and 804) is two. In some embodiments, the last parent node of the parent level (e.g., the right-most parent node) may have a different number of leaf nodes based on the total number of leaf nodes and the preset maximum fullness of each parent node. In some embodiments, the system can redistribute the pointers of leaf nodes from any of its parent nodes to another branch node of the parent level so long as the system maintains the sequential order of the data.

In some embodiments, the system can also redistribute the parent-child relationship between branch nodes. For example, the B-tree has a first branch node that is full with pointer to child branch nodes and a second branch node that is not full. In the example, the system redistributes some of the pointers to the child branch nodes to the second branch node so the system maintains the invariance of the B-tree.

Figure 11:
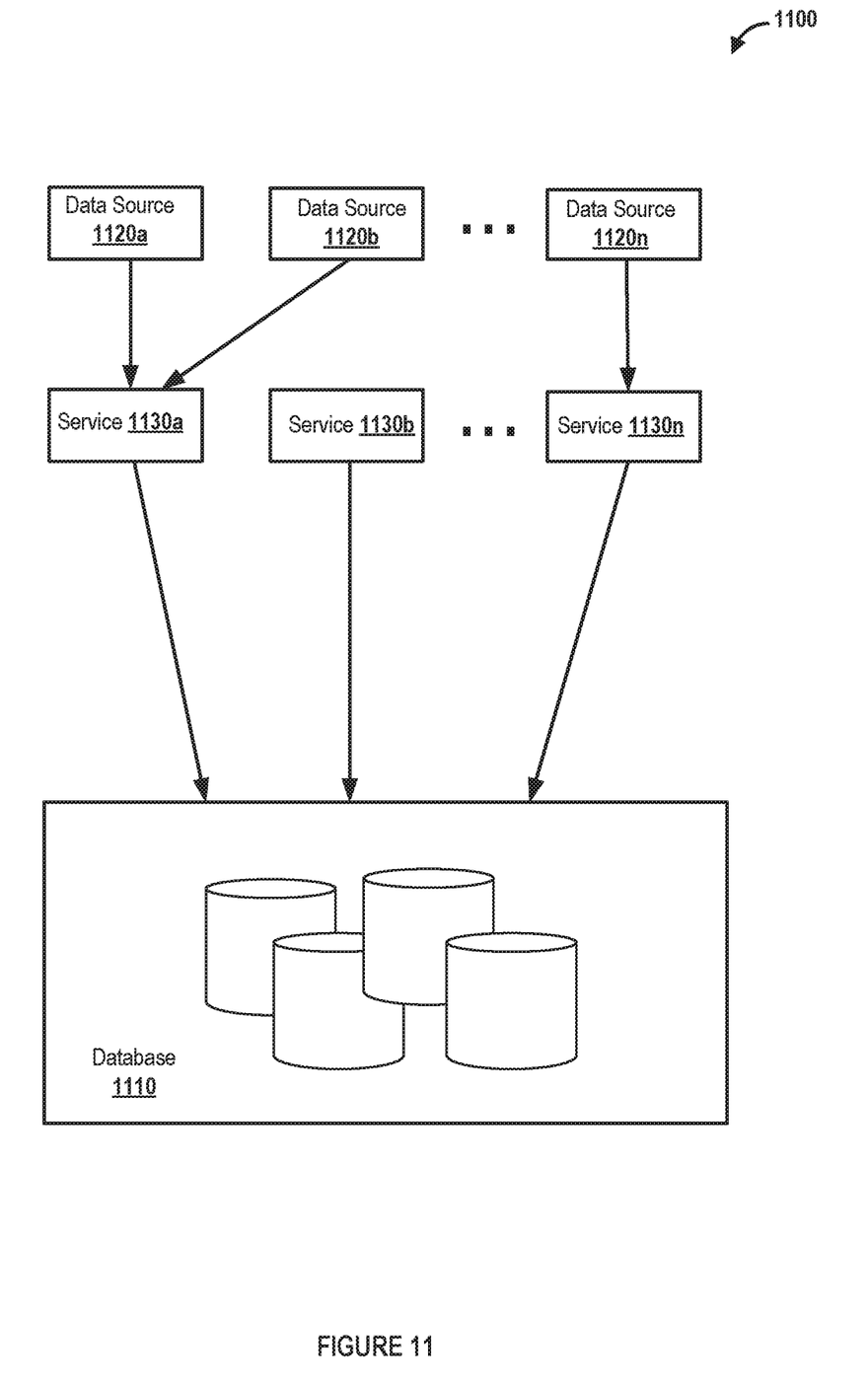
FIG. 11 illustrates components of an example system in which an embodiment may be implemented.

FIG. 11 illustrates components of a system 1100 in which an embodiment may be implemented. As shown, system 1100 includes a database 1110, multiple data sources 1120 (e.g., data sources 1120*a*, 1120*b*, . . . , 1120*n*), and multiple database management services 1130 (e.g., database management services 1130*a*, 1130*b*, . . . 1130*n*). Though multiple data sources 1120 and multiple database management services 1130 are shown, it should be noted that there may be any number of data sources or database management services in system 1100.

Database 1110 may include any suitable non-volatile data store for organizing and storing data from the multiple data sources 1120. For example, in some embodiments, database 1110 may be implemented as software-defined storage such as VMware vSAN that clusters together server-attached hard disks and/or solid state drives (HDDs and/or SSDs), to create a flash-optimized, highly resilient shared datastore designed for virtual environments. In some embodiments, database 1110 may be implemented as one or more storage devices, for example, one or more hard disks, flash memory modules, solid state disks, and optical disks (e.g., in a computing device, server, etc.). In some embodiments, database 1110 may include a shared storage system having one or more storage arrays of any type such as a network-attached storage (NAS) or a block-based device over a storage area network (SAN). Database 1110 may store data from one or more data sources 1120 in a B-tree structure as discussed.

Each data source 1120 may correspond to one or more physical devices (e.g., servers, computing devices, etc.) or virtual devices (e.g., virtual computing instances, containers, virtual machines (VMs), etc.). For example, a physical device may include hardware such as one or more central processing units, memory, storage, and physical network interface controllers (PNICs). A virtual device may be a device that represents a complete system with processors, memory, networking, storage, and/or BIOS, that runs on a physical device. For example, the physical device may execute a virtualization layer that abstracts processor, memory, storage, and/or networking resources of the physical device into one more virtual devices. Each data source 1120 may generate data that is loaded into database 1110. Each data source 1120 may request operations to be performed on the database 1110, such as bulk loading as discussed.

Each database management service 1130 may be a process or application executing on one or more physical devices or virtual devices. In certain embodiments, a database management service 130 may execute on the same device as a data source 1120. In certain embodiments, a database management service 1130 may execute on a separate device from the data source 1120. A database management service 1130 may be an automatic service, or a manual service (e.g., directed by a human).

Each database management service 1130 may be coupled (e.g., via a network, as running on the same device, etc.) to one or more data sources 1120 and to the database 1110 (e.g., via a network). Further, each database management service 1130 may be configured to generate and perform operations on database 1110. For example, a given data source 1120 may send a bulk loading request for a range of keys in database 1110 to a database management service 1130. Database 1110 may be implemented as a B-tree as discussed above. The database management service 1130 may perform the bulk loading on database 1110 as discussed above.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be implemented as useful machine operations. In addition, one or more embodiments of the invention also relate to a device or an apparatus for performing these operations. The apparatus may be specially constructed for required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media that may be based on any existing or subsequently developed technology for embodying computer programs in a manner that enables them to be read by a computer. Examples of a computer readable medium include a hard drive, a Solid State Disk (SSD), network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method for bulk load for a B-tree, comprising:
   receiving a stream of sorted tuples;
   generating a first leaf node of the B-tree by allocating a first page for the first leaf node from a leaf page queue comprising a first plurality of sequential pages;
   writing one or more tuples of the stream of sorted tuples sequentially to the first page allocated for the first leaf node;
   determining that the first leaf node is full;
   generating a second leaf node of the B-tree by allocating a second page for the second leaf node from the leaf page queue, wherein the second page is sequential with the first page;
   writing one or more additional tuples of the stream of sorted tuples sequentially to the second page allocated for the second leaf node;
   generating a parent node for the first leaf node and the second leaf node of the B-tree by allocating a third page for the parent node from a parent page queue comprising a second plurality of sequential pages, the parent node comprising a first indication of the first leaf node and a second indication of the second leaf node, the first indication and the second indication stored sequentially in the third page allocated for the parent node;
   generating a third leaf node by allocating a fourth page for the third leaf node from the leaf page queue, wherein the fourth page is sequential to the second page;

writing one or more further additional tuples of the stream of sorted tuples sequentially to the fourth page allocated for the third leaf node;

storing sequentially a third indication in the third page for the parent node;

obtaining the first indication from the parent node; and reading the one or more tuples and the one or more additional tuples from the first leaf node and the second leaf node by sequentially accessing, in a single read operation based on the first indication, the first page and the second page.

2. The method of claim 1, further comprising:

determining that the parent node is full; and generating a second parent node by allocating a fifth page for the second parent node from the parent page queue sequential to the third page, the second parent node comprising a new indication of a newly generated leaf node.

3. The method of claim 2, further comprising:

generating a third parent node by allocating a sixth page for the third parent node from a second parent page queue comprising a third plurality of sequential pages, the third parent node comprising a fourth indication of the parent node and a fifth indication of the second parent node, the fourth indication and the fifth indication stored sequentially in the sixth page allocated for the third parent node.

4. The method of claim 1, further comprising:

balancing the B-tree to meet a minimum fullness when a right-most leaf node does not have a sufficient number of tuples; and balancing the B-tree comprises redistributing one or more tuples among leaves of the B-tree so that the leaves of the B-tree meet the minimum fullness.

5. The method of claim 1, further comprising:

obtaining a plurality of indications from a plurality of parent nodes; and reading a plurality of tuples from each leaf node of a plurality of leaf nodes corresponding to the plurality of indications by sequentially accessing, in a single read operation based on the first indication, a plurality of pages corresponding to the plurality of leaf nodes.

6. A system for bulk load for a B-tree, comprising:

a processor; and non-transitory computer-readable storage medium embodying computer program instructions for bulk loading for a B-tree, the computer program instructions implementing a method, the method comprising:

receiving a stream of sorted tuples;

generating a first leaf node of the B-tree by allocating a first page for the first leaf node from a leaf page queue comprising a first plurality of sequential pages;

writing one or more tuples of the stream of sorted tuples sequentially to the first page allocated for the first leaf node;

determining that the first leaf node is full;

generating a second leaf node of the B-tree by allocating a second page for the second leaf node from the leaf page queue, wherein the second page is sequential with the first page;

writing one or more additional tuples of the stream of sorted tuples sequentially to the second page allocated for the second leaf node;

generating a parent node for the first leaf node and the second leaf node of the B-tree by allocating a third page for the parent node from a parent page queue comprising a second plurality of sequential pages, the parent node comprising a first indication of the first leaf node and a second indication of the second leaf node, the first indication and the second indication stored sequentially in the third page allocated for the parent node;

generating a third leaf node by allocating a fourth page for the third leaf node from the leaf page queue, wherein the fourth page is sequential to the second page;

writing one or more further additional tuples of the stream of sorted tuples sequentially to the fourth page allocated for the third leaf node;

storing sequentially a third indication in the third page for the parent node;

obtaining the first indication from the parent node; and reading the one or more tuples and the one or more additional tuples from the first leaf node and the second leaf node by sequentially accessing, in a single read operation based on the first indication, the first page and the second page.

7. The system of claim 6, wherein the method further comprises:

determining that the parent node is full; and generating a second parent node by allocating a fifth page for the second parent node from the parent page queue sequential to the third page, the second parent node comprising a new indication of a newly generated leaf node.

8. The system of claim 7, wherein the method further comprises:

generating a third parent node by allocating a sixth page for the third parent node from a second parent page queue comprising a third plurality of sequential pages, the third parent node comprising a fourth indication of the parent node and a fifth indication of the second parent node, the fourth indication and the fifth indication stored sequentially in the sixth page allocated for the third parent node.

9. The system of claim 6, wherein the method further comprises:

balancing the B-tree to meet a minimum fullness when a right-most leaf node does not have a sufficient number of tuples; and balancing the B-tree comprises redistributing one or more tuples among leaves of the B-tree so that the leaves of the B-tree meet the minimum fullness.

10. The system of claim 6, wherein the method further comprises:

obtaining a plurality of indications from a plurality of parent nodes; and reading a plurality of tuples from each leaf node of a plurality of leaf nodes corresponding to the plurality of indications by sequentially accessing, in a single read operation based on the first indication, a plurality of pages corresponding to the plurality of leaf nodes.

11. A non-transitory computer-readable storage medium embodying computer program instructions for bulk loading for a B-tree, the computer program instructions, when executed by at least one processor, implementing a method, the method comprising:

receiving a stream of sorted tuples;

generating a first leaf node of the B-tree by allocating a first page for the first leaf node from a leaf page queue comprising a first plurality of sequential pages;

writing one or more tuples of the stream of sorted tuples sequentially to the first page allocated for the first leaf node;

determining that the first leaf node is full;

generating a second leaf node of the B-tree by allocating a second page for the second leaf node from the leaf page queue, wherein the second page is sequential with the first page;

writing one or more additional tuples of the stream of sorted tuples sequentially to the second page allocated for the second leaf node;

generating a parent node for the first leaf node and the second leaf node of the B-tree by allocating a third page for the parent node from a parent page queue comprising a second plurality of sequential pages, the parent node comprising a first indication of the first leaf node and a second indication of the second leaf node, the first indication and the second indication stored sequentially in the third page allocated for the parent node;

generating a third leaf node by allocating a fourth page for the third leaf node from the leaf page queue, wherein the fourth page is sequential to the second page;

writing one or more further additional tuples of the stream of sorted tuples sequentially to the fourth page allocated for the third leaf node;

storing sequentially a third indication in the third page for the parent node;

obtaining the first indication from the parent node; and reading the one or more tuples and the one or more additional tuples from the first leaf node and the second leaf node by sequentially accessing, in a single read operation based on the first indication, the first page and the second page.

12. The non-transitory computer-readable storage medium of claim 11, wherein the method further comprises:

determining that the parent node is full; and generating a second parent node by allocating a fifth page for the second parent node from the parent page queue sequential to the third page, the second parent node comprising a new indication of a newly generated leaf node.

13. The non-transitory computer-readable storage medium of claim 12, wherein the method further comprises:

generating a third parent node by allocating a sixth page for the third parent node from a second parent page queue comprising a third plurality of sequential pages, the third parent node comprising a fourth indication of the parent node and a fifth indication of the second parent node, the fourth indication and the fifth indication stored sequentially in the sixth page allocated for the third parent node.

14. The non-transitory computer-readable storage medium of claim 11, wherein the method further comprises:

balancing the B-tree to meet a minimum fullness when a right-most leaf node does not have a sufficient number of tuples; and balancing the B-tree comprises redistributing one or more tuples among leaves of the B-tree so that the leaves of the B-tree meet the minimum fullness.

* * * * *